United States Patent Office 2,880,136
Patented Mar. 31, 1959

2,880,136

CO-PRECIPITATE OF ALUMINIUM HYDROXIDE WITH MAGNESIUM CARBONATE AND/OR CALCIUM CARBONATE

David Neville Gore, Dorking, England, assignor to Macleans Limited, Brentford, England, a British company No Drawing. Application October 18, 1954
Serial No. 463,057

Claims priority, application Great Britain
November 13, 1953

7 Claims. (Cl. 167—55)

The present invention relates to compositions of matter suitable for use as bases for stomach powders and is more particularly concerned with co-precipitates including aluminium hydroxide in a form having an extended buffer effect together with at least one of the compounds calcium carbonate and magnesium carbonate.

In the treatment of gastric hyperacidity, the tendency of contemporary medicine has been to move away from the traditional practice of administering excessive quantities of the straightforward antacids, such as sodium bicarbonate, which raise the pH of the gastric contents to high levels, and to replace them wholly or in part by antacid buffers, such as aluminium hydroxide. The aim has been to control the pH of the gastric contents at a physiologically more desirable level, in order to minimise stimulation of further secretion of acid by the stomach, the so-called "acid-rebound," and to avoid the risks of alkalosis.

The traditional types of "stomach powder" used heretofore for treating gastric hyperacidity frequently comprised mixtures of sodium bicarbonate, calcium carbonate, magnesium carbonate and bismuth carbonate. The preparation of an improved base suitable for incorporating into such powders and consisting of co-precipitated carbonates of calcium and magnesium has been described in Patent No. 2,453,446. The stomach powder base therein disclosed was prepared by mixing an aqueous solution of soluble calcium and magnesium salts and a water-soluble carbonate, such as sodium carbonate. The resultant washed co-precipitate, produced under properly controlled conditions, presented the carbonates of calcium and magnesium in a finely divided and intimately mixed form, which is best suited to the purpose in view.

A modification of the procedure described in the aforesaid Patent No. 2,453,446 involves, involving the use as starting materials of naturally occurring sources of calcium and magnesium, such as dolomite and magnesian limestone.

Aluminium hydroxide intended to be incorporated in a powder such as that just described is available as dried aluminium hydroxide gel. It is produced by drying the washed gel, which can be obtained by mixing aqueous solutions of an aluminium salt and sodium carbonate, but if the drying operation is conducted at an economically desirable temperature, the product is liable to suffer a serious loss of antacid activity. This fact is recognised in the monograph on dried aluminium hydroxide gel in the 1949 edition of the British Pharmaceutical Codex, which indicates that a drying temperature much in excess of 30° C. will result in a loss of activity. In addition to this restrictive factor, a further disadvantage is that, in the compounding of such an actacid powder as that exemplified above, a preliminary comminution of the dried aluminium hydroxide gel may be necessary in view of its potentially unsuitable physical character.

It is an object of the present invention to produce aluminium hydroxide inexpensively in a form which will permit it to be dried economically at higher temperatures than those at which aluminium hydroxide normally loses its antacid activity, while a further object is to increase the antacid activity with a minimum weight of aluminium hydroxide.

It is a further object of the present invention to provide a stomach powder including aluminium hydroxide and carbonates of calcium and magnesium.

In accordance with one feature of the present invention, a process for the production of aluminium hydroxide in a form which permits it to be dried at higher temperatures than are normally possible with relatively little loss of antacid activity, comprises the steps of mixing a solution of a carbonate with a solution of salts of aluminium and one or both of the metals magnesium and calcium, and recovering a coprecipitate which includes a carbonate of said metal or metals and aluminium hydroxide.

According to a further feature of the invention, a process for making a stomach powder for the treatment of gastric hyperacidity comprises the steps of mixing a solution of a carbonate with a solution of salts of aluminium and one or both of the metals magnesium and calcium and recovering a co-precipitate which includes a carbonate of said metal or metals and aluminium hydroxide and drying the co-precipitate at a temperature of 50° C. or over to form a finely divided and intimately mixed powder retaining the antacid activity of the aluminium hydroxide.

According to a further feature of the invention a process for prolonging the antacid effect of a stomach powder including a buffer agent comprises the step of co-precipitating aluminium hydroxide with one or both of the carbonates of magnesium and calcium.

A composition, according to a further feature of the present invention, which is suitable for use as a base for a stomach powder for the treatment of gastric hyperacidity comprises a finely-divided and intimately mixed co-precipitate of aluminium hydroxide and one or both of the carbonates of magnesium and calcium.

A preferred composition comprises 42–50 parts by weight of calcium carbonate, 13–30 parts by weight of magnesium carbonate as $MgCO_3$ and 17–26 parts by weight of aluminium hydroxide as $Al(OH)_3$.

By adopting suitable conditions of precipitation, it has been found, for example, that a co-precipitate approximating 47 parts by weight of calcium carbonate, 30 parts by weight of magnesium carbonate as $MgCO_3$ and 23 parts by weight of aluminium hydroxide as $Al(OH)_3$, and all relating to an anhydrous product, can be produced in a finely-divided form, and that the drying operation can be conducted at a temperature of 50°–55° C. and even up to 60° C. without significant loss in the antacid activity of the aluminium hydroxide component.

It has further been found that a composition in accordance with the present invention is not only superior in its antacid effect to compositions according to prior proposals, but is also superior, particularly as regards retention of its capacity for providing a buffer action for an extended period, as compared with a composition comprising co-precipitated calcium and magnesium carbonates in physical mixture with precipitated aluminium hydroxide. In a comparative test of a composition of the invention and a composition as just described, the materials were prepared from the same starting materials and the temperature of drying was 50° C. in every case. The antacid activities were assessed by the method described by Gore, Martin and Taylor (J. Pharm. and Pharmacol., 5, 686–691, 1953). A comparison of the results obtained when tabulated graphically serves to demonstrate clearly the extended preservation of activity of the co-precipitated aluminium hydroxide component in the region of pH 3.5 to 4.5, and the loss of activity suffered by this component when added independently after subjection to the same drying conditions.

As in the case of the co-precipitated carbonates of calcium and magnesium referred to in the aforesaid Patent No. 2,453,446 the selection of conditions of co-precipitation of the three-component system of the present invention is influential in determining the physical and antacid properties of the co-precipitate. If it is desirable to employ heat during the precipitation to bring the reaction mixture into a filterable state, the temperature employed and the duration of heating must be such as to avoid loss of activity of the aluminium hydroxide component.

A further condition is that the precipitation must be conducted at such a temperature and in such a manner as to avoid retention of carbon dioxide in the reaction mixture in order to avoid undue loss of magnesium as bicarbonate in the filtrate.

Concerning the composition of the co-precipitate, the proportions of calcium and magnesium carbonates can be varied as desired, but it has been found that there is a relative falling off in the protective effect upon antacid activity of the aluminium hydroxide component when this is present in excess. 25 percent of aluminium hydroxide in the final product has been found to be satisfactory.

In order that the present invention may be readily understood, the following specific examples are given by way of illustration.

*Example 1*

A solution containing 43.8 grams of calcium chloride hexahydrate, 30.2 grams of magnesium chloride hexahydrate and 30.9 grams of aluminium chloride hexahydrate in 500 mls. of water was prepared, heated to 70° C., and mixed with a solution containing 161.7 grams of sodium carbonate decahydrate in 513 mls. of water, also heated to 70° C. The mixing was conducted by pouring the two solutions simultaneously into a wide mouthed open vessel in which a mechanical stirrer was in operation. The mixture of the two solutions was heated rapidly to 90° C. and this temperature was maintained for 20 minutes. Thereafter, the mixture was cooled rapidly and after the precipitate had settled the supernatant liquor was syphoned off through a filter. The residual mixture was slurried with 2 litres of water, the precipitate was allowed to settle and the supernatant liquor was syphoned off as before. The steps of slurrying, settling and syphoning off of the supernatant liquor were repeated twice more. The residue was then transferred to the filter, to drain off excess liquid, and the moist residue was removed from the filter. The resultant co-precipitate was found to include up to 23% of aluminium hydroxide.

*Example 2*

The same quantities of the solutions of Example 1 were mixed under identical conditions and the temperature of the mixture was held at 65–70° C. for two minutes, during which time the precipitate ceased to be gelatinous. The mixture was then quenched by pouring into an equal volume of cold water and, when the precipitate had settled, the supernatant liquor was syphoned off through a filter. The residual mixture was reslurried with an equal volume of cold water and the supernatant liquor was removed as before. This washing by decantation was repeated once more and the residue was then transferred to the filter to drain off excess liquid and gave a product which included up to 23% of aluminium hydroxide.

*Example 3*

The same quantities of the solutions of Example 1 were mixed under identical conditions and the mixture was maintained at 70° C. for 20 minutes. The mixture was then worked up as in Example 2, giving a product including up to 23% of aluminium hydroxide.

*Example 4*

The same quantities and solutions were employed as in Example 1, the solutions being heated to 90° C. prior to mixing. The mixture was maintained at 85–90° C. for two minutes, and was then worked up as in Example 2, giving a product which included up to 23% of aluminium hydroxide.

*Example 5*

The procedures of Examples 1, 2, 3 and 4 were repeated, with the whole of the magnesium and corresponding part of the calcium in the solution of calcium and magnesium chlorides being obtained from dolomite. In each case, 27.4 grams of dry dolomite were dissolved in 62.4 grams of hydrochloric acid (35% w./w.), in which solution was also dissolved 11.3 grams of calcium chloride hexahydrate, the volume finally being adjusted to 500 ml. by the addition of water. Each of the resultant co-precipitates was found to include up to 23% of aluminium hydroxide.

In the above examples, the moist product was dried at a temperature of about 50° C. but it should be understood that it is possible to use still higher temperatures, if suitable precautions are taken, and the following indicates how the drying can be effected to give a satisfactory result.

The product obtained as a result of co-precipitation may be placed in trays in a heated chamber such as an oven whose temperature lies between 50° and 60° C. The time of drying is conveniently kept as low as possible as there may be a danger with unduly prolonged drying of adversely affecting the antacid properties of the aluminium hydroxide.

It will thus be seen that, by means of the invention it is possible to produce in a commercial form stomach powders consisting of calcium and magnesium carbonate salts in conjunction with aluminium hydroxide in an active form.

I claim:

1. A process for making a composition of matter useful as a stomach powder in the treatment of gastric hyperacidity, which comprises the steps of admixing an aqueous solution of sodium carbonate and an aqueous solution of aluminium chloride, calcium chloride and magnesium chloride in proportions to produce a co-precipitate containing about 23 parts by weight of aluminium hydroxide as $Al(OH)_3$, about 47 parts by weight of calcium carbonate and about 30 parts by weight of magnesium carbonate as $MgCO_3$, allowing the admixed solutions to interact to produce the said co-precipitate, recovering the co-precipitate from the reaction mixture and drying it to form a finely-divided and intimately-mixed powder, the aluminium hydroxide component of the powder constituting a buffer agent having an extended buffer effect.

2. A process of making a stomach powder for use in the treatment of gastric hyperacidity, which comprises the steps of forming an aqueous solution of a sodium carbonate, forming an aqueous solution of aluminium chloride and the chloride of at least one of the metals selected from the group consisting of calcium and magnesium, heating each of the solutions to approximately 70° C., admixing the heated solutions and maintaining the admixed solutions at approximately 65–70° C. for approximately 2 minutes to form a co-precipitate containing about 23 parts by weight of aluminium hydroxide and at least one of the substances selected from the group consisting of calcium carbonate and magnesium carbonate, recovering the co-precipitate from the reaction mixture and drying the co-precipitate to form a finely-divided and intimately-mixed powder having antacid activity and an extended buffer effect due to the condition of the aluminium hydroxide component thereof.

3. A process according to claim 2, in which the co-precipitate is dried at a temperature of at least 50° C.

4. A composition of matter for use as a stomach powder in the treatment of gastric hyperacidity comprising a finely-divided and intimately-mixed co-precipitate of aluminium hydroxide and at least one substance selected from the group consisting of calcium carbonate and magnesium carbonate.

5. The composition defined in claim 4, in which the triple co-precipitate comprises about 23 parts by weight of aluminium hydroxide, about 47 parts by weight of calcium carbonate and about 30 parts by weight of magnesium carbonate.

6. A composition of matter for use as a stomach powder in the treatment of gastric hyperacidity comprising a finely-divided and intimately-mixed triple co-precipitate of 17 to 26 parts by weight of aluminium hydroxide as $Al(OH)_3$, 42 to 50 parts by weight of calcium carbonate and 13 to 30 parts by weight of magnesium carbonate as $MgCO_3$.

7. A process of making a stomach powder for use in the treatment of gastric hyperacidity, which comprises the steps of simultaneously pouring an aqueous solution of sodium carbonate heated to a temperature of 70° to 90° C. and an aqueous solution of aluminum chloride, calcium chloride and magnesium chloride also heated to a temperature of 70° to 90° C. into a vessel, stirring the admixed solutions in the vessel while maintained at a temperature of 70° to 90° C. for a time sufficient to allow the sodium carbonate to react with the aluminium, calcium and magnesium chlorides to produce a triple co-precipitate containing aluminium hydroxide, calcium carbonate and magnesium carbonate, allowing the co-precipitate to settle, removing supernatant liquor, slurrying the co-precipitate with water, allowing the co-precipitate to settle and removing the supernatant liquor thereby to free the co-precipitate of water-soluble contaminants, removing grossly-held residual water from the co-precipitate by draining on a filter and drying the co-precipitate at a temperature of 50° to 60° C. to form a buffered antacid composition of matter containing aluminium hydroxide, calcium carbonate and magnesium carbonate.

References Cited in the file of this patent

UNITED STATES PATENTS 2,453,446    McGeorge _____ Nov. 9, 1948

OTHER REFERENCES

Howard: Modern Encyclopedia, 5th ed. (1947), pages 34, 35, 37.

Gore: Journal of Pharmacy and Pharmacology, vol. 5, No. 10, October 1953, pp. 686–691.

Murphy: Journal of the American Pharmaceutical Assoc., Sci. Ed., vol. 41, No. 7, July 1952, pp. 361–365.

U.S. Dispensatory, 24th ed. (1947), pages 54 to 56.